(12) United States Patent
Landreth

(10) Patent No.: US 10,715,615 B1
(45) Date of Patent: Jul. 14, 2020

(54) DYNAMIC CONTENT DISTRIBUTION SYSTEM AND ASSOCIATED METHODS

(71) Applicant: Government of the United States, as represented by the Secretary of the Air Force, Kirtland AFB, NM (US)

(72) Inventor: Eachan Russell Landreth, Albuquerque, NM (US)

(73) Assignee: THE GOVERNMENT OF The United States of America as Represented by the Secretary of the Air Force, Washington, DC (US)

( * ) Notice: Subject to any disclaimer, the term of this patent is extended or adjusted under 35 U.S.C. 154(b) by 109 days.

(21) Appl. No.: 16/174,706

(22) Filed: Oct. 30, 2018

Related U.S. Application Data

(60) Provisional application No. 62/713,341, filed on Aug. 1, 2018.

(51) Int. Cl.
- *G06F 15/173* (2006.01)
- *H04L 29/08* (2006.01)
- *H04L 12/26* (2006.01)

(52) U.S. Cl.
CPC .......... *H04L 67/2814* (2013.01); *H04L 43/08* (2013.01); *H04L 67/288* (2013.01); *H04L 67/2842* (2013.01)

(58) Field of Classification Search
CPC . H04L 67/2814; H04L 43/08; H04L 67/2842; H04L 67/288; H04L 41/0213; H04L 29/08072; H04L 41/12
See application file for complete search history.

(56) References Cited

U.S. PATENT DOCUMENTS

| | | | |
|---|---|---|---|
| 2003/0093463 A1* | 5/2003 | Graf | H04L 29/06 709/203 |
| 2006/0218301 A1* | 9/2006 | O'Toole | H04L 12/185 709/244 |
| 2006/0259607 A1* | 11/2006 | O'Neal | H04L 12/1836 709/223 |
| 2006/0271700 A1* | 11/2006 | Kawai | H04L 67/1008 709/233 |
| 2007/0002821 A1* | 1/2007 | Carlson | H04L 29/06 370/349 |
| 2007/0174467 A1* | 7/2007 | Ballou, Jr. | H04L 63/0838 709/227 |

(Continued)

*Primary Examiner* — Razu A Miah
(74) *Attorney, Agent, or Firm* — James M. Skorich

(57) ABSTRACT

Systems and associated methods for dynamic split file distribution of digital content to multiple nodes in a network. A basic flow for each of a collection of method subtypes 1→p (for p between 1 and a total number of distribution nodes in the subnetwork) comprises 1) determining communication paths with the p highest single inter-nodal bandwidths from each of available source nodes to its adjacent distribution nodes; 2) passing the content from the source node(s) along the p highest inter-nodal bandwidths, striking the receiving node(s) from a list of distribution nodes and adding those nodes to a list of source nodes; and 3) repeating 1) and 2) until targeted network nodes receive a respective copy of the passed content. At each completed method flow cycle, each subnetwork subsequently presented to each source node is analyzed to dynamically select and apply a method subtype that is appropriate for that subnetwork.

19 Claims, 5 Drawing Sheets

(56) References Cited

U.S. PATENT DOCUMENTS

| | | | | |
|---|---|---|---|---|
| 2009/0125584 A1* | 5/2009 | Agrawala | H04L 67/2814 | 709/203 |
| 2009/0262741 A1* | 10/2009 | Jungck | H04L 29/12066 | 370/392 |
| 2010/0211689 A1* | 8/2010 | Bijwaard | H04N 21/6405 | 709/228 |
| 2010/0250772 A1* | 9/2010 | Mao | H04N 21/222 | 709/231 |
| 2011/0082910 A1* | 4/2011 | Breslin | H04L 41/0816 | 709/217 |
| 2012/0084350 A1* | 4/2012 | Xie | G06F 9/5088 | 709/203 |
| 2012/0131093 A1* | 5/2012 | Hamano | G06F 9/5088 | 709/203 |
| 2012/0158994 A1* | 6/2012 | McNamee | H04L 45/02 | 709/238 |
| 2012/0198045 A1* | 8/2012 | Sakata | H04L 12/6418 | 709/223 |
| 2013/0311649 A1* | 11/2013 | DeFrancesco | H04L 43/04 | 709/224 |
| 2014/0112171 A1* | 4/2014 | Pasdar | H04L 45/70 | 370/252 |
| 2014/0222988 A1* | 8/2014 | Shlomo | H04L 67/1097 | 709/224 |
| 2015/0106420 A1* | 4/2015 | Warfield | H04L 41/5041 | 709/201 |
| 2015/0120833 A1* | 4/2015 | De Foy | H04L 67/1097 | 709/204 |
| 2015/0149600 A1* | 5/2015 | Thibeault | H04L 67/1097 | 709/219 |
| 2015/0229733 A1* | 8/2015 | Yang | H04L 67/2842 | 709/213 |
| 2016/0036838 A1* | 2/2016 | Jain | H04L 63/1416 | 726/23 |
| 2017/0310703 A1* | 10/2017 | Ackerman | H04L 63/1458 | |

* cited by examiner $1 \rightarrow 1$: Step 1

$1 \rightarrow 1$: Step 2

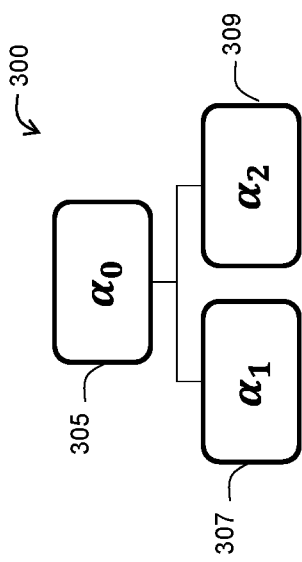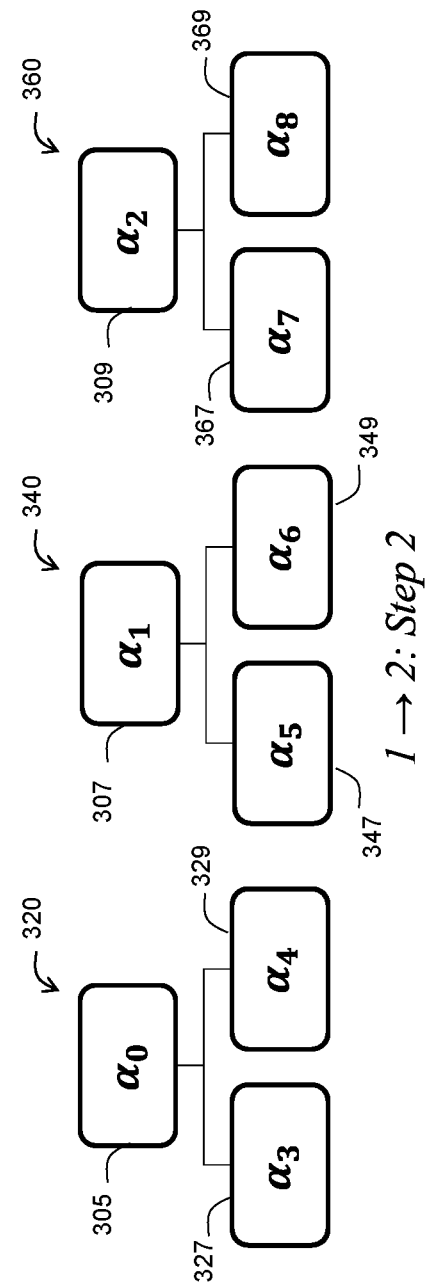
FIG. 3A
FIG. 3B

DYNAMIC CONTENT DISTRIBUTION SYSTEM AND ASSOCIATED METHODS

CROSS-REFERENCE TO RELATED APPLICATION

This non-provisional patent application claims the benefit of U.S. Provisional Application No. 62/713,341 filed on Aug. 1, 2018 and titled Dynamic Content Distribution Method, the entire content of which is incorporated herein by reference.

STATEMENT OF GOVERNMENT INTEREST

The invention described herein may be manufactured, used, and licensed by or for the Government of the United States for all governmental purposes without the payment of any royalty.

BACKGROUND

Mass distribution of digital content over a wide area network, such as the Internet, is commonly implemented using one or more sources (e.g., servers) where such data are available, and some number of destination sites (e.g., clients) to which copies of the data are transmitted and stored. Traditional methods of distributing digital content typically fall into two regimes: serial and parallel. In the serial distribution method, digital content files are distributed from source to destination in a single call or push. The serial method is optimal when only one client is requesting an update, or when an update is called by or pushed to a single client in the network. However, in most other circumstances, parallel distribution methods may be used to reduce the time needed to distribute files to multiple destination sites in a network.

In one method of parallel distribution, a processing element of the network, referred to herein as a "node," may be designed to selectively act as a server and/or a client. File distribution workload may be shared in such a way that digital content may be distributed among various source nodes which, in turn, may distribute copies of the digital content files in parallel to various destination nodes in the network (e.g., the server paradigm). Optimal load balancing of file distribution responsibility among many network nodes remains an area of significant research.

As a matter of definition, consider a network of n nodes, where n is at least two. Denote the single inter-nodal bandwidths by $v_{i,j}$, $i \neq j$, where i,j are the ith and jth nodes of the network, respectively. In common content distribution schemes as described above, digital content to be distributed exists typically in one location. If not, the situation may be decomposed (e.g., divide a network logically into subnetworks) to create the manageable scenario where the content to be distributed exists in one location.

Also as a matter of definition, consider the problem of distributing content of generally large size among targeted nodes of a network from a single source location. In a non-trivial network distribution scheme, where the size of the content to be distributed is large when compared to the single inter-nodal bandwidth, the time $\tau_{serial}$ required to distribute the content with size $c_{size}$ from the source node $i = \alpha_0$ in the serial distribution paradigm, assuming minimal variance in inter-nodal bandwidth over time, may be modeled as follows:

$$\tau_{serial} = c_{size} \sum_{j=1, j \neq a}^{n-1} \frac{1}{v_{a_0, j}}$$

Consider next the strict parallel distribution paradigm, again assuming the network is non-trivial in the parallel distribution case (i.e., that the single inter-nodal bandwidths are affected when distributing the content in question in parallel). Note: The rationale for the aforementioned assumption is that, if the network is trivial in the parallel distribution case, then the optimal distribution of content occurs when the file is distributed in parallel. In other words, the size of the digital content is not large when compared to the single inter-nodal bandwidth, which contradicts the operating assumption above. Denote the new single inter-nodal bandwidths, when burdened by the file distribution, by $v'_{i,j}(t)$. Under the above assumptions, the time required to distribute content with size $c_{size}$ from the source $i = \alpha$ to the nodes in the strict parallel distribution paradigm (one source) is, at best, modeled as follows:

$$\tau_{parallel} = c_{size} * \frac{1}{\min_j (v'_{a_0, j}(t))}$$

where $\min_j (v'_{a_0,j}(t))$ is the network bottleneck. Note that v' represents a function of time, as v' will shift over time as the load on the source node decreases.

The best-case scenario above uses the assumption that the source node has adequate computational and network resources to distribute the content to each destination node without affecting inter-nodal bandwidths. Most of the time, however, this is not the case in practice. However, if this scenario turns out to not be the case, a common method is to generate new distribution subnetworks with sources and nodes that do satisfy the relation modeled above.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 3A is a schematic diagram of a distribution state in a 1→2 subtype of a dynamic content distribution method, in accordance with embodiments of the disclosure;

FIG. 3B is a schematic diagram of a distribution state in a 1→2 subtype of a dynamic content distribution method, in accordance with embodiments of the disclosure;

DETAILED DESCRIPTION

Figure 1:
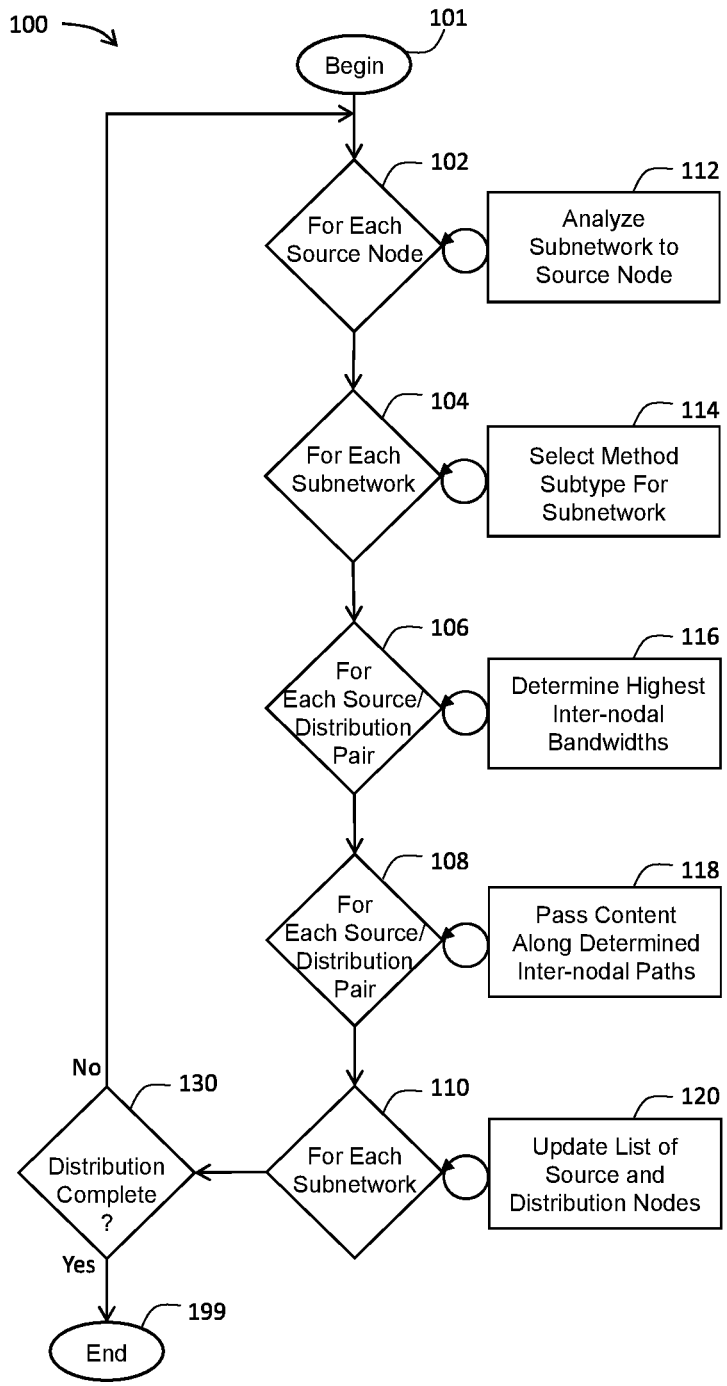
FIG. 1 is a flowchart illustrating a dynamic content distribution method, in accordance with embodiments of the disclosure.

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

The present disclosure relates generally to systems and associated methods of distributing digital content of generally large size among nodes of a network in as short a time as possible. For example, and without limitation, the dynamic content distribution system and associated methods described herein may be applicable to the following:

a) Cyber Security: Rapid evacuation of large datasets during a cyberattack or cyber event b) Data Centers: Protection and back up of data assets, database management for cloud storage providers c) Data Science: Distribution of large datasets, data management within sensor networks, modeling and simulation requiring large datasets, Geographical Information Systems (GIS), and any Graphical Processing Unit (GPU)-related processes or processes requiring distribution of large datasets to a network with multiple nodes e) Communication Networks: Reduce time for distribution of Amber Alerts and emergency/crisis communications, streaming of news broadcasts, image delivery, and live-streaming of media to device networks and optimization of user networks, peer-to-peer data streaming f) Finance: High speed financial market trading systems requiring large amounts of data, integrated back-end for distributed modeling of financial markets, cryptocurrency mining, blockchain generation (enables development of significantly larger scale blockchains with reduced time to market)

g) Healthcare: Management of large-scale clinical trials research, management of glucose monitoring data, management of bio-lab data, "Omics"—genomics pooled data curation h) Internet of Things (IoT) Devices: Smart Home applications via data sharing throughout home networks, enhanced data interchange within IoTs i) Logistics: Route mapping, modeling and optimization (method may incorporate variant of the Traveling Salesman Problem)

j) Online Advertising: Rapid dissemination of information to targeted groups, enhancement of "reward" methods of advertising, reduction of brand awareness times One embodiment of the present disclosure may comprise a software system and associated method(s) for fully dynamic split file distribution of digital content to multiple nodes in a network. Referring more specifically to FIG. 1, for example, and without limitation, the dynamic content distribution method 100 may comprise application of a collection of method subtypes 1→p (for p between 1 and a total number of distribution nodes in a subnetwork) where the basic flow of each method subtype 1→p may be as follows:

1) At Block 116, determine the communication paths with the p highest single inter-nodal bandwidths from each of available source node (initially, just one) to its adjacent distribution nodes (as iterated at Block 106);

2) At Block 118, pass the content from each of the source node(s) to distribution nodes positioned along the p highest inter-nodal bandwidths (as iterated at Block 108), striking the receiving node(s) from the list of distribution nodes and adding the latter to the list of source nodes (Blocks 110 and 120); and 3) At Block 130, return to repeat processes 1) and 2) above until targeted (e.g., all) network nodes have their respective copy of the passed content (at which point the process ends at Block 199).

From the beginning at Block 101 and thereafter at each completed method flow cycle, the present method may analyze each subnetwork (Block 112) subsequently presented to a newly designated source node (Block 102) and may dynamically select and apply a method subtype (Block 114) that is most appropriate for that subnetwork (Block 104).

Figure 2A:
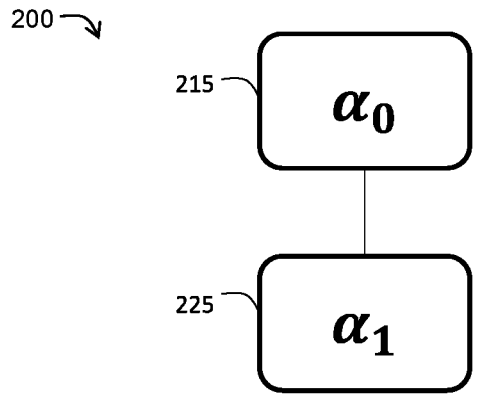
FIG. 2A is a schematic diagram of a distribution state in a 1→1 subtype of a dynamic content distribution method, in accordance with embodiments of the disclosure.
Figure 2B:
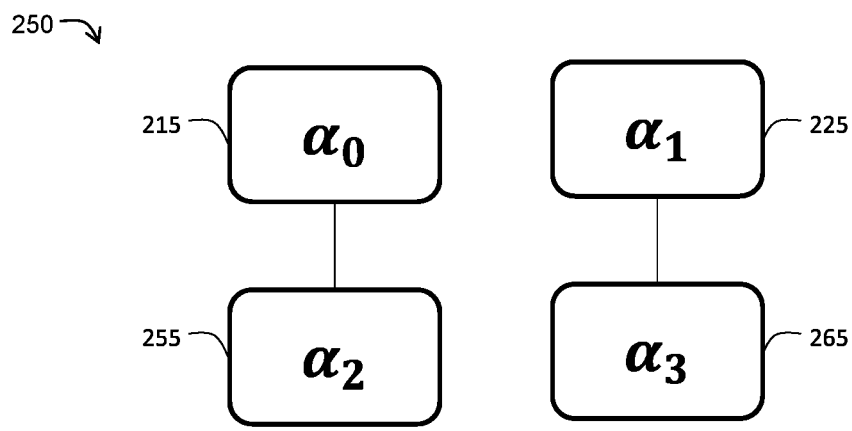
FIG. 2B is a schematic diagram of a distribution state in a 1→1 subtype of a dynamic content distribution method, in accordance with embodiments of the disclosure.

Referring now to FIG. 2A and FIG. 2B, progression through distribution states 200, 250 in a 1→1 subtype of a dynamic content distribution method according to embodiments of the present system and method will now be discussed in detail. For example, and without limitation, consider the same non-trivial network described above and let the node on which the content resides be denoted by $\alpha_0$ 215. Optimal distribution methods for relatively isotropic bandwidth networks may be illustrated in terms of the distribution times for each of the following subtypes of the disclosed method:

1→1: For this subtype of the method 100 shown in FIG. 1, content may be distributed from a source to one other node on the network. For example, and without limitation, in step 1 illustrated as distribution state 200 in FIG. 2A, the highest single inter-nodal bandwidths $v_{\alpha_0,j}$ may be determined. Then, the content file may be distributed from the source $\alpha_0$ 215 to a node positioned along the highest inter-nodal bandwidth (as shown, $\alpha_1$ 225). To signify availability of the content at the receiving node 225, the node 225 may be stricken from a list of distribution nodes and added to a list of source nodes. In step 2 illustrated as distribution state 250 in FIG. 2B, for each of the two source nodes $\alpha_0$ 215, $\alpha_1$ 225 each of the two highest single inter-nodal bandwidths $v_{\alpha_i,j}$ sequentially may be determined. To signify availability of the content at the receiving nodes 255 and 265, each of these nodes 255, 265 may then be stricken from the list of distribution nodes and added to the list of source nodes after each selection is made. As related in FIG. 1, the method 100 may continue ad nauseum until the list of distribution nodes is empty (i.e., until the content has been distributed to every targeted node on the network).

To find a closed form solution for the time required to distribute the content using the 1→1 subtype of the disclosed method 100, the time to distribute the content among the nodes in the network may be approximated by assuming that the single inter-nodal bandwidths are relatively isotropic with bandwidth v. Using this assumption, the first step 200 may require time $$\tau_1^{1\rightarrow 1} = \frac{c_{size}}{v}$$

and may distribute content to one node. The second step 250 may require time $$\tau_2^{1\rightarrow 1} = \frac{c_{size}}{v}$$

and may distribute content to two more nodes. A third step (not shown) similarly may require time $$\tau_3^{1\rightarrow 1} = \frac{c_{size}}{v}$$

and may distribute the content to four more nodes. Continuing in this fashion, at the $k^{th}$ step of the 1→1 subtype of the disclosed method 100, the time required to distribute the content may be defined generally as $$\tau_k^{1\rightarrow 1} = \frac{c_{size}}{v}$$

and may distribute content to $2^k - 2^{k-1} = 2^{k-1}$ nodes. However, at the end of each kth stage, a total of $2^{k-1} + 2^{k-1} = 2^{k-1}*(1+1) = 2^k$ nodes in the network may contain the content. The process 100 may continue until the total number of nodes to which content is distributed equals n (e.g., all nodes on the network have received the content). Thus, the following relation holds:

$$2^k = n$$

so that, $$k = \left\lceil \frac{\ln(n)}{\ln(2)} \right\rceil$$

Therefore, an approximation for the total time to distribute the content to the network in the 1→1 subtype of the disclosed method, is as follows:

$$\tau_{1\rightarrow 1} = \frac{c_{size}}{v} * k = \frac{c_{size}}{v} * \left\lceil \frac{\ln(n)}{\ln(2)} \right\rceil$$

1→2: For this subtype of the method 100 shown in FIG. 1, content may be distributed from a source to two other nodes on the network. For example, and without limitation, in step 1 illustrated as distribution state 300 in FIG. 3A, the two highest single inter-nodal bandwidths $v_{\alpha_0,j}$ and $v_{\alpha_0,k}$ may be determined. Then, the content may be distributed from the source 305 to the two nodes 307, 309 positioned along these two highest bandwidths. To signify availability of the content, the nodes 307, 309 may be stricken from the list of distribution nodes and added to the list of source nodes. In step 2 illustrated as distribution states 320, 340, and 360 in FIG. 3B, for each of the three source nodes $\alpha_0$ 305, $\alpha_1$ 307, $\alpha_2$ 309 each of the two highest single inter-nodal bandwidths $v_{\alpha_i,j}$ sequentially may be determined. To signify availability of the content at the receiving nodes 327, 329, 347, 349, 367 and 369, each of these nodes may be stricken from the list of distribution nodes and added to the list of source nodes after each selection is made. As related in FIG. 1, the method 100 may continue ad nauseum until the list of distribution nodes is empty (i.e., the content has been distributed to every targeted node on the network).

To find a closed form solution for the time required to distribute the content using the 1→2 subtype of the disclosed method 100, the time to distribute the content among all nodes in the network may be approximated by assuming that the single inter-nodal bandwidths are relatively isotropic with bandwidth v. Then, the first step 300 may require time $$\tau_1^{1\rightarrow 2} = \frac{2*c_{size}}{v}$$

and may distribute content to two nodes 307, 309. The second step 320, 340, 360 also may require time $$\tau_2^{1\rightarrow 2} = \frac{2*c_{size}}{v}$$

and may distribute content to six nodes 327, 329, 347, 349, 367, 369. A third step (not shown) similarly may require time $$\tau_3^{1\rightarrow 2} = \frac{2*c_{size}}{v}$$

and may distribute content to eighteen (18) nodes. Continuing in this fashion, at the $k^{th}$ step of the 1→2 subtype of the disclosed method 100, the time required to distribute the content may be defined generally as is $$\tau_k^{1\rightarrow 2} = \frac{2*c_{size}}{v}$$

and may distribute content to $3^k - 3^{k-1} = 3^{k-1}*2$ nodes. However, at the end of each kth stage, a total of $3^{k-1}*2 + 3^{k-1} = 3^{k-1}*(2+1) = 3^k$ nodes in the network may contain the content. The process 100 may continue until the total number of nodes to which content is distributed equals n (e.g., all targeted nodes on the network have received the content). Thus, the following relation holds:

$$3^k = n$$

so that, $$k = \left\lceil \frac{\ln(n)}{\ln(3)} \right\rceil$$

Therefore, an approximation for the total the total time to distribute the content at each stage in the 1→2 subtype of the method 100, $\tau_{1\rightarrow 2}$, is as follows:

$$\tau_{1\rightarrow 2} = \frac{2*c_{size}}{v} * k = \frac{2*c_{size}}{v} * \left\lceil \frac{\ln(n)}{\ln(3)} \right\rceil$$

1→3: This subtype of the method 100 is substantially equivalent to the 1→2 subtype, except that it differs in that each source node may distribute content to three nodes instead of two. In this subtype of the method 100, the first step may require time $$\tau_1^{1\to 3} = \frac{3 * c_{size}}{v}$$

and may distribute content to three nodes. The second step may similarly require time $$\tau_2^{1\to 3} = \frac{3 * c_{size}}{v}$$

and may distribute content to twelve nodes. The third step may require time $$\tau_3^{1\to 3} = \frac{3 * c_{size}}{v}$$

and may distribute content to forty-eight (48) nodes. Continuing in this fashion, at the $k^{th}$ step of the 1→3 subtype of the method 100, the time required to distribute the content may be $$\tau_k^{1\to 3} = \frac{3 * c_{size}}{v}$$

and the content may be distributed to $4^k - 4^{k-1} = 4^{k-1} * 3$ nodes. However, at the end of each kth step, a total of $4^{k-1}*3 + 4^{k-1} = 4^{k-1}*(3+1) = 4^k$ nodes in the network may contain the content. The process 100 may continue until the total number of nodes to which content is distributed equals n. Thus, the following relation holds:

$$4^k = n$$

so that, $$k = \left\lceil \frac{\ln(n)}{\ln(4)} \right\rceil$$

Therefore, an approximation for the total the total time to distribute the content in the 1→3 subtype of the method 100, $\tau_{1\to 3}$, is as follows:

$$\tau_{1\to 3} = \frac{3 * c_{size}}{v} * k = \frac{3 * c_{size}}{v} * \left\lceil \frac{\ln(n)}{\ln(4)} \right\rceil$$

From the above examination of the latter subtypes of the disclosed method 100, a complete characterization of the method 100 may encompass $\tau_{1\to m}$ subtypes, where m is the size of the network on which the method 100 is employed. Inductively, the total time to distribute content in each subtype of the method 100 may be expressed as follows:

$$\tau_{1\to m} = \frac{m * c_{size}}{v} * \left( \frac{\ln(n)}{\ln(m+1)} \right)$$

which is a strictly increasing function for m>0 and each n>2. From this characterization, the dynamic nature of the method 100 becomes clear: specifically, by employing different subtypes of the method 100, one may control the time to distribute content among all nodes of a network.

In terms of total time to distribute content among network nodes, the efficiency of the disclosed method 100 is superior to that of the trivial serial and parallel distribution techniques described above. For example, and without limitation, in the serial distribution method described above, the total time required to distribute content may be modeled as follows:

$$\tau_{serial} = c_{size} \sum_{j=1, j\neq\alpha}^{n-1} \frac{1}{v_{\alpha_0, j}}$$

For a relatively isotropic bandwidth network with n nodes and isotropic bandwidth v, this representation reduces as follows:

$$\tau_{serial} = c_{size} \frac{n-1}{v}$$

Therefore, the ratio $\tau_{1\to 1}$ to $\tau_{serial}$ is:

$$\frac{\tau_{1\to 1}}{\tau_{serial}} = \left[ \frac{c_{size}}{v} * \left( \frac{\ln(n)}{\ln(2)} \right) \right] * \left[ \frac{v}{c_{size}*(n-1)} \right]$$

such that:

$$\frac{\tau_{1\to 1}}{\tau_{serial}} = \left[ \left( \frac{\ln(n)}{\ln(2)} \right) \right] * \left[ \frac{1}{(n-1)} \right].$$

Figure 5:
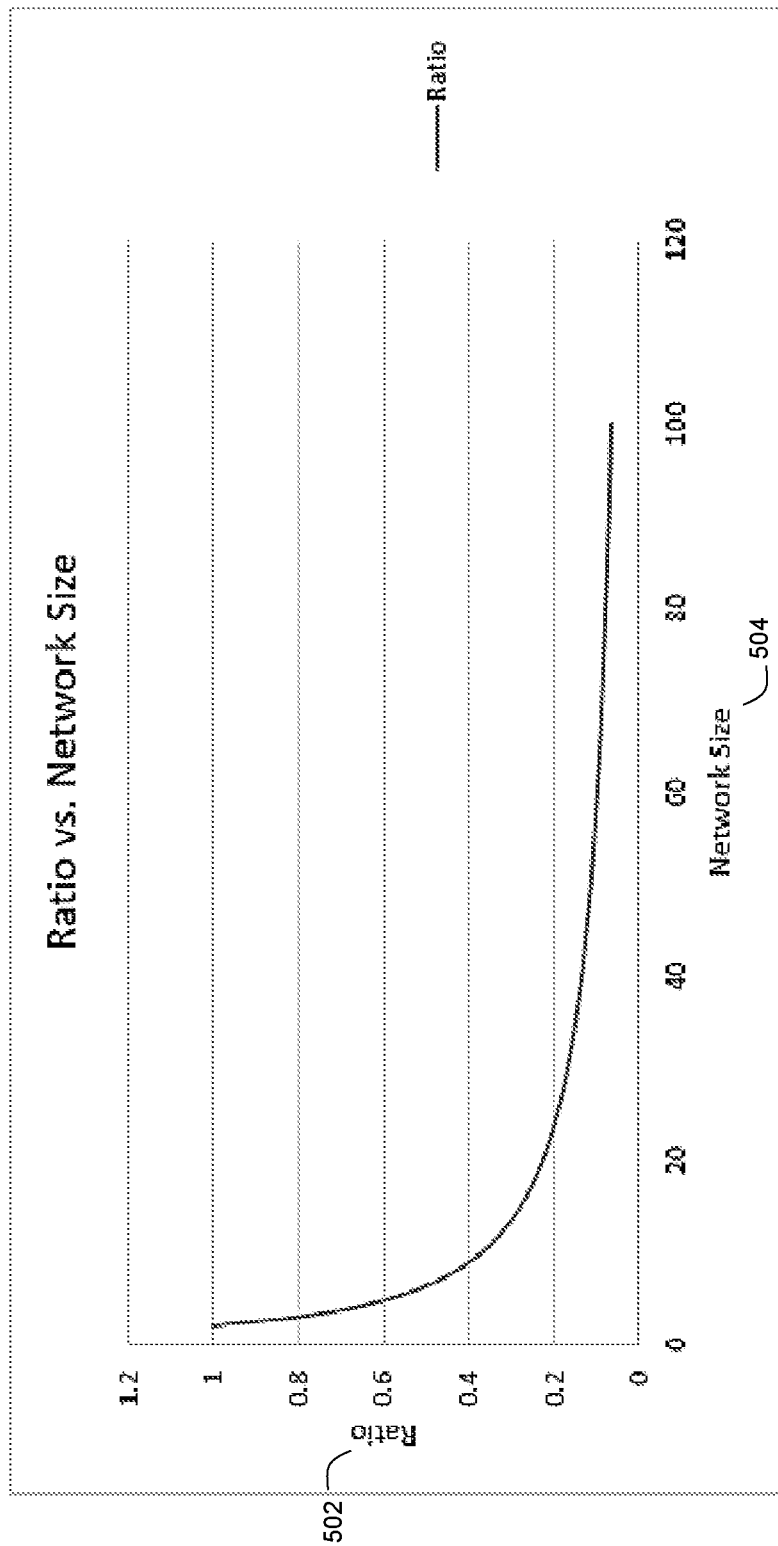
FIG. 5 is a performance comparison graph for a dynamic content distribution system (DCDS), in accordance with embodiments of the disclosure.

Referring now to FIG. 5, for example and without limitation, a plot 500 of the ratio 502 $\tau_{1\to 1}$ to $\tau_{serial}$ versus increasing network size 504 illustrates the advantageous reduction in content distribution time of the disclosed method 100 compared to the standard serial content distribution method.

In a relatively isotropic bandwidth network, the serial and parallel content distribution methods are nearly equivalent. Therefore, the advantageous reduction in content distribution time for the disclosed method 100 as compared to a standard parallel content distribution method is still significant. For a more concrete example, consider a network consisting of one hundred (100) nodes. Applying the method 100 in the 1→1 subtype may reduce content distribution time by ~93.3% over the serial or parallel methods. Therefore, if content usually takes an hour to distribute on an isotropic bandwidth network in the serial or parallel content distribution methods, the content may only take about four (4) minutes to distribute using the method 100 in the 1→1 subtype on an isotropic bandwidth network.

The performance of the disclosed method 100 is superior not only to that of the trivial serial and parallel distribution techniques in isotropic bandwidth networks in the same conditions, but also in non-isotropic bandwidth networks. For example, and without limitation, consider the 1→1 subtype of the method 100 on a non-isotropic bandwidth network of n nodes. In step 1, each of the inter-nodal bandwidths $v_{\alpha_0,j}$ between the source, $\alpha_0$, and the nodes, j, j∈{1, . . . , n−1} may be determined. Next, the largest inter-nodal bandwidth, $$\alpha_1 = \min_j \left\{ \frac{1}{v_{\alpha_0,j}} \right\}$$

may be determined. Then, the content may be distributed from $\alpha_0$ to $\alpha_1$ (1→1) in keeping with method 100 as described above. In step 2, the process may repeat, except this time with two source nodes $\alpha_0$, $\alpha_1$, and by then determining the next largest inter-nodal bandwidth $$\alpha_2 = \min_j \left\{ \frac{1}{v_{\alpha_0,j}} \right\}, j \neq \alpha_1,$$

and then $$\alpha_3 = \min_j \left\{ \frac{1}{v_{\alpha_1,j}} \right\},$$

$j \neq \alpha_2$, $j \neq \alpha_0$ (similar to step 2 of the isotropic bandwidth case of the 1→1 subtype of the method 100). However, note that content may be delivered to one node before the other and, as such, the method 100 in this case may dictate beginning a new transfer instead of waiting for both transfers to complete. Therefore, the first stage may require time $$\tau_1^{1 \to 1} = \min_j \left\{ \frac{1}{v_{\alpha_0,j}} \right\} * \frac{c_{size}}{v}$$

and may distribute content to one node, $\alpha_1$. The first portion of the second step may require time $$\tau_{2,1}^{1 \to 1} = \min \left( \min_j \left\{ \frac{1}{v_{\alpha_0,j}} \right\}, \min_j \left\{ \frac{1}{v_{\alpha_1,j}} \right\} \right) * \frac{c_{size}}{v}$$

and may distribute content to another node. The second half of the second step may require time $$\tau_{2,2}^{1 \to 1} = \max \left( \min_j \left\{ \frac{1}{v_{\alpha_0,j}} \right\}, \min_j \left\{ \frac{1}{v_{\alpha_1,j}} \right\} \right) * \frac{c_{size}}{v}.$$

Inductively, it is apparent that subtypes of the method 100 in a non-isotropic bandwidth network may evolve in a rather complex and idiosyncratic manner that is directly related to the inter-nodal bandwidths of the network. Nonetheless, this example demonstrates that the distribution time may be less than in the series or parallel cases.

In the serial case, the first distribution time is the same as $\tau_1^{1 \to 1}$. In addition, the second distribution time is the same as $\tau_{2,1}^{1 \to 1}$. However, the content is distributed to one more node. In the third stage, the distribution time will be less than in as $\tau_{3,1}^{1 \to 1}$. However, this time reduction is due to the fact that the distribution has already been completed in the second step. Thus, the distribution time for the series method in the third step is still a subset of as $\tau_{2,1}^{1 \to 1}$. In fact, at each step k of method 100, the model described above shows the following:

$$\Sigma_j^S = \beta * \tau_{k,1}^{1 \to 1}$$

where $\beta > 1$ and $\tau_j^S$ denotes the time required by the serial method to distribute the content to the same number of nodes in the kth step of the method 100. By summing over all targeted nodes, the content distribution time using the method 100 clearly is less than that of the serial method. By a similar argument, the content distribution time with the method 100 is shown to be less than that of the parallel method. Finally, the content distribution time with any subtypes of the method 100 that are not equivalent to the parallel method may be shown through generalization to be less than that of either of the serial and parallel methods.

Figure 4:
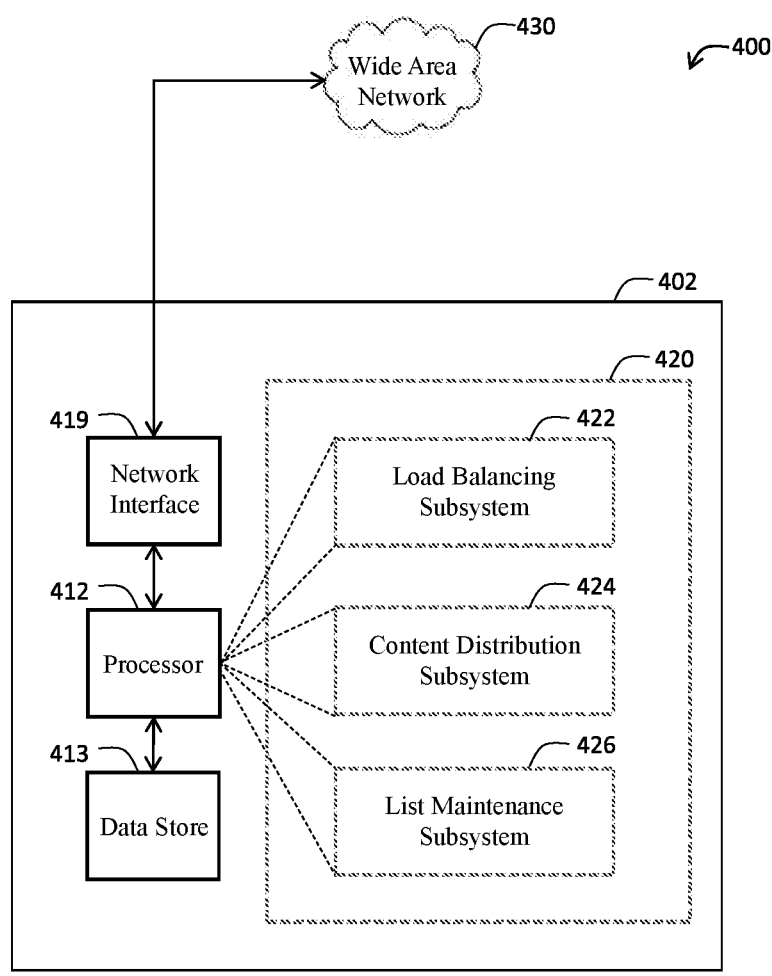
FIG. 4 is a schematic block diagram of a dynamic content distribution system (DCDS), in accordance with embodiments of the disclosure.

The block diagram of FIG. 4 illustrates an example embodiment of a dynamic content distribution system (DCDS) 400, also referred to as a content distribution system or simply as a distribution system, in accordance with embodiments of the disclosure. Those skilled in the art will understand that the principles of the present disclosure may be implemented on or in data communication with any type of suitably arranged device or system configured to perform digital content distribution operations, in any combination.

Continuing to refer to FIG. 4, in more detail, a node 402 of a network 430 may comprise a processor 412 that may be operable to accept and execute computerized instructions, and also a data store 413 that may store data and instructions used by the processor 412. More specifically, the processor 412 may be positioned in data communication with some number of the networked devices and may be configured to direct input from such networked devices to the data store 413 for storage and subsequent retrieval. For example, and without limitation, the processor 412 may be in data communication with external computing resources, such as the wide area network (WAN) 430, through a network interface 419. Furthermore, the processor 412 may be configured to direct input received from components of the WAN 430 to the data store 413 for storage. Similarly, the processor 412 may be configured to retrieve data from the data store 413 to be forwarded as output to various components of the WAN 430.

For example, and without limitation, the computerized instructions of the DCDS 400 may be configured to implement a Load Balancing Subsystem 422 that may be stored in the data store 413 and retrieved by the processor 412 for execution. The Load Balancing Subsystem 422 may be operable to analyze a subnetwork of the WAN 430 that is adjacent to the node 402, and to dynamically select a method subtype to apply to that subnetwork. Also for example, and without limitation, the computerized instructions of the DCDS 400 may be configured to implement a Content Distribution Subsystem 424 that may be stored in the data store 413 and retrieved by the processor 412 for execution. The Content Distribution Subsystem 424 may be operable to determine the highest inter-nodal bandwidths available to the node 402, and to pass content from the node 402 along these bandwidths. Also for example, and without limitation, the computerized instructions of the DCDS 400 may be configured to implement a List Maintenance Subsystem 426 that may be stored in the data store 413 and retrieved by the processor 412 for execution. The List Maintenance Subsystem 426 may be operable to update lists of source and destination nodes as content is delivered to targeted components of the WAN 430.

Those skilled in the art will appreciate that the present disclosure contemplates the use of computer instructions and/or systems configurations that may perform any or all of the operations involved in content distribution among nodes of a network. The disclosure of computer instructions that include Load Balancing Subsystem 422 instructions, Content Distribution Subsystem 424 instructions, and List Maintenance Subsystem 426 instructions is not meant to be limiting in any way. Those skilled in the art will readily appreciate that stored computer instructions and/or systems configurations may be configured in any way while still accomplishing the many goals, features and advantages according to the present disclosure.

The method 100 may be created by implementing computer instructions in a suitable programming language or scripting language. To create such software, specific considerations and permissions for accessing the software may be made for proper operation. For example, and without limitation, the following may merit careful consideration:

Single Executable: In this approach, the method 100 may be created and implemented by having a single executable code on a network location that is accessible by targeted nodes on the network. Nodes on the network may queue the source code when each has received and verified the content from a distribution node, removed itself from a (shared) distribution list, and added itself to a (shared) list of source nodes.

This approach to creating the method 100 may suffer from racing issues for large sized networks, as serial access to source and distribution lists may disrupt the process and lead to runaway content distribution events. This approach to creating the method 100 also may be less advantageous for use in networks where the total network size is unknown, or where nodes in the network do not have, or should not have, access to the executable location.

Multiple Executables: In this approach, the method 100 may be created and implemented by having multiple executable source codes distributed to targeted nodes on a network, controlled by queueing distribution at initialization of the software and associating metadata listing the subnetworks to which to distribute the content. Nodes on the network may queue the source code when each has received and verified content from another source node and may distribute the content further among pre-assigned nodes that are inherited from metadata included with the content dissemination from the source node. This approach to creating the method 100 may suffer from issues associated with exposure of metadata, which may compromise the architecture of the network. This approach to creating the method 100 may be advantageous for use in networks where the total network size is unknown or very large, or where nodes in the network should not have access to a single executable.

Embodiments of method 100 described above employ simple, uniform subtypes. However, additional controllability of content distribution times may be obtained by mixing subtypes of the method 100 (that is, by using different 1→k subtypes at different steps of the distribution process). For example, and without limitation, each step in the method 100 may be considered to present a subnetwork having varying numbers of distribution nodes (which may be set at will). Thus, the method 100 may apply different subtypes of those available to distribute content to nodes on this subnetwork in variable amounts of time. Utilization of this alternative offers the advantage of further control over content distribution times in a network, at the expense of higher investment in creation and translation of this alternative of the method 100 into a suitable programming language.

An exemplary application of the disclosed method 100 may be to counter a Distributed Denial of Service (DDoS) attack. During a DDoS attack, an attacking network typically overloads a set of servers with data requests that cannot be handled by the servers. By incorporating the method 100 as a backend executable on data downloads coming off of a server, the method 100 may be utilized as a method of countering DDOS attacks. More specifically, by utilizing a large sized "junk" data set and employing the backend executable to initiate transfer of the junk data to offending nodes, a DDoS may be countered by significantly hindering the available network bandwidth of the offending network (e.g., turning the offending network against itself).

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (e.g., random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

What is claimed is:

1. A computer-implemented method of digital content distribution comprising:
   receiving configuration information for a non-trivial network comprising:
     a plurality n of nodes, where n is greater than or equal to 2; and
     at least one inter-nodal bandwidth $v_{i,j}$ configured for data communication between nodes i and j of the plurality n of nodes, where i is not equal to j;
   setting to FALSE a respective distribution state for each of the plurality n of nodes, each defined as a first-level distribution node;
   receiving a content package at a root node of the plurality n of nodes;
   setting to TRUE the distribution state for the root node;
   identifying a subset m of the at least one inter-nodal bandwidth configured in data communication with the root node, the subset m defined as a first-level subnetwork;
   selecting a first-level distribution subtype 1→p, where $p \in \{1 \ldots m\}$;
   determining a subset p of the first-level subnetwork characterized by p of the at least one inter-nodal bandwidth characterized by highest capacity of the first-level subnetwork and each configured in data communication with a respective first-level distribution node, defined as at least one first-level selected distribution node;

transmitting the content package from the root node to the at least one first-level selected distribution node; and iterating, until the respective distribution state is TRUE for each of the plurality n of nodes, such that:

for each of the plurality n of nodes having the respective distribution state equal to TRUE, defined as a source node:

identifying a subset m of the at least one inter-nodal bandwidth vi,j configured in data communication with the source node, the subset m defined as a subnetwork;

selecting a distribution subtype 1→p, where p∈{1 ... m};

determining a subset p of the subnetwork characterized by p of the at least one inter-nodal bandwidth vi,j characterized by highest capacity of the subnetwork and each configured in data communication with a respective distribution node, defined as a selected distribution node;

transmitting the content package from the source node to the selected distribution node; and setting to TRUE the distribution state for the selected distribution node.

2. The method according to claim 1, where the content package is characterized by a size greater than the at least one inter-nodal bandwidth Vi,j.

3. The method according to claim 1, where setting to FALSE the respective distribution state for a first of the plurality n of nodes further comprises adding a distribution identifier for the first of the plurality n of nodes to a distribution nodes list; and where setting to TRUE the respective distribution state for a second of the plurality n of nodes further comprises adding a source identifier for the second of the plurality n of nodes to a source nodes list and removing the distribution identifier for the second of the plurality n of nodes from the distribution nodes list.

4. The method according to claim 1, where the at least one inter-nodal bandwidth Vi,j of the non-trivial network further comprises a plurality of substantially equal inter-nodal bandwidths, to define an isotropic bandwidth network.

5. The method according to claim 1, where the plurality n of nodes is further characterized as addressable computing devices, to define the non-trivial network as a fixed network.

6. The method according to claim 1, where
the plurality n of nodes is further characterized as network platform users; and
the at least one inter-nodal bandwidth is further characterized as a content sharing rate;
to define the non-trivial network as a variable network.

7. A digital content distribution system characterized by a computer processor and by a non-transitory computer-readable storage medium comprising a plurality of instructions which, when executed by the computer processor, is configured to:

receive configuration information for a non-trivial network comprising:
a plurality n of nodes, where n is greater than or equal to 2; and
at least one inter-nodal bandwidth $v_{i,j}$ configured for data communication between nodes i and j of the plurality n of nodes, where i is not equal to j;

set to FALSE a respective distribution state for each of the plurality n of nodes, each defined as a distribution node;

receive a content package at a root of the plurality n of nodes, defined as node $α_0$;

set to TRUE the distribution state for node $α_0$;

identify a subset m of the at least one inter-nodal bandwidth configured in data communication with the root node, the subset m defined as a first-level subnetwork;

select a first-level distribution subtype 1→p, where p∈{1 ... m};

determine a subset p of the first-level subnetwork characterized by p of the at least one inter-nodal bandwidth characterized by highest capacity of the first-level subnetwork and each configured in data communication with a respective first-level distribution node, defined as at least one first-level selected distribution node;

transmit the content package from the root node to the at least one first-level selected distribution node; and iterate, until the respective distribution state is TRUE for each of the plurality n of nodes, such that:

for each of the plurality n of nodes having the respective distribution state equal to TRUE, defined as a source node:

identify a subset m of the at least one inter-nodal bandwidth configured in data communication with the source node, the subset m defined as a subnetwork;

select a distribution subtype 1→p, where p∈{1 m};

determine a subset p of the subnetwork characterized by p of the at least one inter-nodal bandwidth characterized by highest capacity of the subnetwork and each configured in data communication with a respective distribution node, defined as a selected distribution node;

transmit the content package from the source node to the selected distribution node; and set to TRUE the distribution state for the selected distribution node.

8. The system according to claim 7, where the content package is characterized by a size greater than the at least one inter-nodal bandwidth $v_{i,j}$.

9. The system according to claim 7, further configured to:
add a distribution identifier for a first of the plurality n of nodes to a distribution nodes list so as to set to FALSE the respective distribution state for the first of the plurality n of nodes; and
add a source identifier for a second of the plurality n of nodes to a source nodes list and removing the distribution identifier for the second of the plurality n of nodes from the distribution nodes list so as to set to TRUE the respective distribution state for the second of the plurality n of nodes.

10. The system according to claim 7, where the at least one inter-nodal bandwidth $v_{i,j}$ of the non-trivial network further comprises a plurality of substantially equal inter-nodal bandwidths, to define an isotropic bandwidth network.

11. The system according to claim 7, where the content package further comprises digital data.

12. The system according to claim 7, where the plurality n of nodes is further characterized as addressable computing devices, to define the non-trivial network as a fixed network.

13. The system according to claim 7, where
the plurality n of nodes is further characterized as network platform users; and
the at least one inter-nodal bandwidth $v_{i,j}$ is further characterized as a content sharing rate;
to define the non-trivial network as a variable network.

14. A method of object distribution model construction comprising:
receiving configuration information for a non-trivial network comprising:

a plurality n of nodes, where n is greater than or equal to 2; and at least one inter-nodal bandwidth $v_{i,j}$ configured for data communication between nodes i and j of the plurality n of nodes, where i is not equal to j;

setting to FALSE a respective distribution state for each of the plurality n of nodes, each defined as a distribution node;

simulating reception of a content package at a root of the plurality n of nodes, defined as node α0;

setting to TRUE the distribution state for node α0;

identifying a subset m of the at least one inter-nodal bandwidth configured in data communication with the root node, the subset m defined as a first-level subnetwork;

selecting a first-level distribution subtype 1→p, where p∈{1 . . . m};

determining a subset p of the first-level subnetwork characterized by p of the at least one inter-nodal bandwidth characterized by highest capacity of the first-level subnetwork and each configured in data communication with a respective first-level distribution node, defined as at least one first-level selected distribution node;

transmitting the content package from the root node to the at least one first-level selected distribution node; and iterating, until the respective distribution state is TRUE for each of the plurality n of nodes, such that:

for each of the plurality n of nodes having the respective distribution state equal to TRUE, defined as a source node:

identifying a subset m of the at least one inter-nodal bandwidth configured in data communication with the source node, the subset m defined as a subnetwork;

selecting a distribution subtype 1→p, where p∈{1 . . . m};

determining a subset p of the subnetwork characterized by p of the at least one inter-nodal bandwidth characterized by highest capacity of the subnetwork and each configured in data communication with a respective distribution node, defined as a selected distribution node;

simulating transmission of the content package from the source node to the selected distribution node; and setting to TRUE the distribution state for the selected distribution node.

15. The method according to claim 14, where the content package is characterized by a size greater than the at least one inter-nodal bandwidth $v_{i,j}$.

16. The method according to claim 14, where setting to FALSE the respective distribution state for a first of the plurality n of nodes further comprises adding a distribution identifier for the first of the plurality n of nodes to a distribution nodes list; and where setting to TRUE the respective distribution state for a second of the plurality n of nodes further comprises adding a source identifier for the second of the plurality n of nodes to a source nodes list and removing the distribution identifier for the second of the plurality n of nodes from the distribution nodes list.

17. The method according to claim 14, where the at least one inter-nodal bandwidth $v_{i,j}$ of the non-trivial network further comprises a plurality of substantially equal inter-nodal bandwidths, to define an isotropic bandwidth network.

18. The method according to claim 14, where the plurality n of nodes is further characterized as addressable computing devices, to define the non-trivial network as a fixed network.

19. The method according to claim 14, where the plurality n of nodes is further characterized as network platform users; and the at least one inter-nodal bandwidth $v_{i,j}$ is further characterized as a content sharing rate;

to define the non-trivial network as a variable network.

* * * * *